(12) United States Patent
Yamada et al.

(10) Patent No.: US 10,006,397 B2
(45) Date of Patent: Jun. 26, 2018

(54) DATA ANALYZER

(71) Applicant: DENSO CORPORATION, Kariya, Aichi-pref. (JP)

(72) Inventors: Naoyuki Yamada, Kariya (JP); Ken Uchiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

(21) Appl. No.: 15/260,737

(22) Filed: Sep. 9, 2016

(65) Prior Publication Data

US 2017/0074200 A1  Mar. 16, 2017

(30) Foreign Application Priority Data

Sep. 11, 2015  (JP) .................. 2015-179448

(51) Int. Cl.
*F02D 41/26* (2006.01)
*F02D 41/30* (2006.01)
*G01M 15/09* (2006.01)
*G05B 15/02* (2006.01)
*F02D 41/28* (2006.01)
*F02D 35/02* (2006.01)

(52) U.S. Cl.
CPC ....... *F02D 41/3005* (2013.01); *F02D 35/023* (2013.01); *F02D 41/26* (2013.01); *F02D 41/28* (2013.01); *G01M 15/09* (2013.01); *G05B 15/02* (2013.01); *F02D 2041/281* (2013.01); *F02D 2041/286* (2013.01); *F02D 2200/0602* (2013.01); *F02D 2200/0614* (2013.01)

(58) Field of Classification Search
CPC ...... F02D 41/3005; F02D 41/26; F02D 41/28; F02D 35/023; F02D 2200/0614; F02D 2200/0602; F02D 2041/286; F02D 2041/281; G05B 15/02; G01M 15/08; G01M 15/09
USPC ....... 123/435, 490; 701/103–106; 73/114.16, 73/114.17, 114.45, 114.47, 114.48, 73/114.49, 114.51
See application file for complete search history.

(56) References Cited

U.S. PATENT DOCUMENTS

| | | |
|---|---|---|
| 2006/0156801 A1 | 7/2006 | Kuhn |
| 2008/0022976 A1 | 1/2008 | Morimoto et al. |
| 2009/0266336 A1 | 10/2009 | Morimoto et al. |
| 2010/0250096 A1 | 9/2010 | Yamada et al. |

FOREIGN PATENT DOCUMENTS

| | | |
|---|---|---|
| JP | 2009-197672 | 9/2009 |
| JP | 2011-158378 | 8/2011 |
| JP | 2014-224465 | 12/2014 |

*Primary Examiner* — Hai Huynh
(74) *Attorney, Agent, or Firm* — Nixon & Vanderhye P.C.

(57) ABSTRACT

A data analyzer for analyzing characterization data to form fuel injection control, including a data obtainer that obtains data from a detection signal of a sensor as a time-series data that changes over time. The data analyzer further includes a differentiator that differentiates the time-series data obtained by the data obtainer, a moving averager that calculates a moving average of the differentiated time-series data by the differentiator, an identifier that identifies a waveform of the time-series data based on the moving average calculated by the moving averager, and a data characterizer characterizes the time-series data based on the waveform of the time-series data identified by the identifier. As such, noise is removed as much as possible, and characteristics of time-series data become analyzable.

10 Claims, 7 Drawing Sheets

DATA ANALYZER

CROSS REFERENCE TO RELATED APPLICATION

The present application is based on and claims the benefit of priority of Japanese Patent Application No. 2015-179448, filed on Sep. 11, 2015, the disclosure of which is incorporated herein by reference.

TECHNICAL FIELD

The present disclosure generally relates to an analyzer that obtains a time-series data from a detection signal of a sensor and analyzes the data.

BACKGROUND INFORMATION

As a technique of obtaining a time-series data that changes as time lapses/progresses from a detection signal of a sensor and analyzing data, a technique of analyzing a fuel injection data is known, i.e., obtaining a time series data regarding fuel injection from a fuel injection valve of an internal combustion engine based on a detection signal of a sensor for an analysis, for example (see a patent document 1 listed below).

In the technique disclosed by a patent document, JP4130823B (patent document 1), the change of the fuel pressure regarding a fuel injected by the fuel injection valve along time, for example, is detected by the pressure sensor as the time-series data of the fuel injection which changes along time, i.e., as time lapses. Then, the detected fuel pressure is used for the measurement of the injection rate.

When obtaining the time-series data that changes along time from the detection signal of the sensor and analyzing them, it is possible to detect a characteristic point as the characteristic of the time-series data. In terms of the time-series data regarding the fuel injection, an injection start timing, an injection end timing, an ignition timing and the like may be, for example, picked up as the characteristic point.

Since the detection signal of the sensor includes noise, the time-series data obtained from the detection signal of the sensor is ridden by the noise. Therefore, even by the comparison between (i) a determination value for detecting the injection start timing, the injection end timing, the ignition timing, etc., and (ii) the time-series data, it may be difficult to detect the characteristic point.

In view of the above situation, a filter such as a low-pass filter may be used for removing the noise from the time-series data. However, when the filter is used, the waveform of time-series data becomes blunt, the timing of the characteristic point shifts and a mis-detection of the characteristic point is caused. When the mis-detection of the characteristic point of the time-series data is caused, the characteristic of the time-series data is not appropriately analyzable.

SUMMARY

It is an object of the present disclosure to provide a technique that appropriately analyzes characteristics of a time-series data by obtaining the time-series data that changes over time from a detection signal of a sensor.

In an aspect of the present disclosure, a data analyzer for analyzing characterization data to perform fuel injection control includes a data analyzing processor, the data analyzing processor configured to include a data obtainer, a differentiator, a moving averager, an identifier, and a data characterizer.

The data obtainer obtains data from a detection signal of a sensor as a time-series data that changes over time.

The differentiator differentiates the time-series data obtained by the data obtainer.

The moving averager calculates a moving average of the differentiation result of the time-series data by the differentiator.

The identifier identifies a waveform of the time-series data based on the moving average calculated by the moving averager.

The data characterizer characterizing the time-series data based on the waveform of the time-series data identified by the identifier.

According to the above-described configuration, the noise is removed from the differentiation result of the time-series data as much as possible by (i) differentiating the time-series data obtained from the detection signal of the sensor, and (ii) calculating the moving average of the differentiation result. The differentiation result represents the change rate of the time-series data, i.e., the waveform.

Thus, based on the differentiation result of the time-series data from which the noise is removed as much as possible, the waveform of the time-series data having noise is identifiable. Then, based on the identified waveform, the characteristics of the time-series data, e.g., the characteristic point and the like, are appropriately analyzable.

The numerals in parentheses above and in the claims are used for showing a relationship between a claim element and a component described in the following embodiment, thereby not limiting the scope of the present disclosure in any manner.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the embodiments of the present disclosure are described based on the drawings.

1. First Embodiment

[1-1. Configuration]

Figure 1:
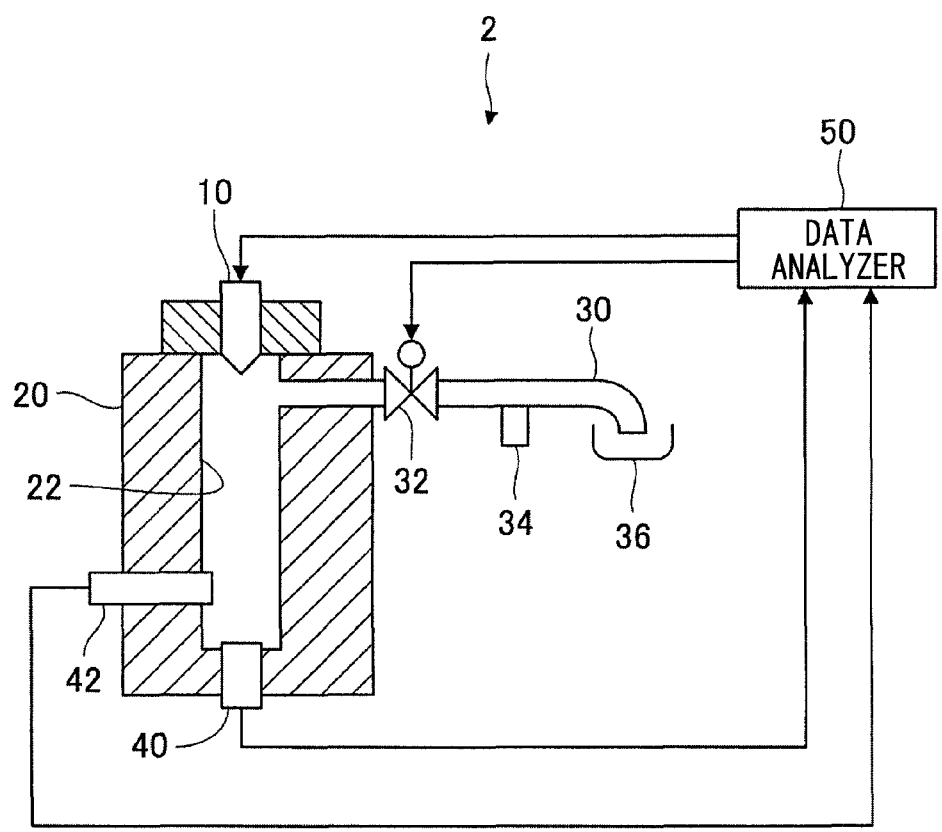
FIG. 1 is a block diagram of a data-analytic system in a first embodiment of the present disclosure.

A data-analytic system 2 shown in FIG. 1 analyzes characteristics of an injection rate of a fuel injection valve 10 which injects fuel, for example, to a diesel engine in a vehicle, which is a kind of an internal-combustion engine for vehicles, before the installation of the engine in a vehicle.

The fuel injection valve 10 is attached to a measurement container 20 that has a measurement chamber 22 provided therein, and fuel is supplied from a fuel pump which is not illustrated. The measurement chamber 22 is filled up with fuel. A discharge pipe 30 which discharge the fuel of the measurement chamber 22, a pressure sensor 40, and a temperature sensor 42 are attached to the measurement container 20.

An electromagnetic open-close valve 32 and a flowmeter 34 are attached to the discharge pipe 30. When the electromagnetic open-close valve 32 opens, the fuel of the measurement chamber 22 is discharged to a fuel tank 36.

The electromagnetic open-close valve 32 is equipped with a pressure control valve (not illustrated), which retains a fuel pressure of the measurement chamber 22 at a predetermined pressure before the injection from the fuel injection valve 10 even during a valve open time of the valve 32.

The flowmeter 34 measures a flow rate of the fuel that is discharged from the discharge pipe 30.

The pressure sensor 40 detects the fuel pressure of the measurement chamber 22. The temperature sensor 42 measures a fuel temperature of the measurement chamber 22.

A data analyzer 50 controls the injection of the fuel from the fuel injection valve 10, and controls the opening and closing of the electromagnetic open-close valve 32. The data analyzer 50 analyzes the characteristics of the injection rate of the fuel injection valve 10 based on a detection signal of the pressure sensor 40.

The data analyzer 50 has a microcomputer disposed therein, which is provided with a Central Processing Unit, (CPU), a Random Access Memory (RAM), a Read-Only Memory (ROM), a flash memory, etc. The data analyzer 50 performs fuel injection for measurement from the fuel injection valve 10, by (i) closing the electromagnetic open-close valve 32, (ii) setting a state that the fuel pressure in the measurement chamber 22 retained at the predetermined pressure by the electromagnetic open-close valve 32, and (iii) outputting an injection instruction pulse to the fuel injection valve 10.

The data analyzer 50 functions as a data obtainer, a differentiator, a moving averager, a range setter, an identifier, and a data characterizer by executing a ROM-stored program in CPU of the data analyzer 50, and performs a data-analysis process.

The data analyzer 50 discharges, upon obtaining a pressure change of the measurement chamber 22 from the pressure sensor 40 at a time when the fuel injection valve 10 performs fuel injection for measurement, the fuel that is injected to the measurement chamber 22 from the fuel injection valve 10 by the opening of the electromagnetic open-close valve 32 into the fuel tank 36 from the discharge pipe 30.

The fuel pressure of the measurement chamber 22 falls to the fuel pressure before the fuel injection valve 10 injects fuel by (i) the opening of the electromagnetic open-close valve 32, and (ii) discharging fuel from the measurement chamber 22.

In other words, the flow rate of the fuel that is discharged from the measurement chamber 22 by the opening of the electromagnetic open-close valve 32 is a fuel quantity that is injected from the fuel injection valve 10 for measurement. The data analyzer 50 obtains the flow rate of the fuel from the flowmeter 34, when the electromagnetic open-close valve 32 opens and the fuel is discharged to the fuel tank 36 from the discharge pipe 30.

[1-2. Process]

Figure 2:
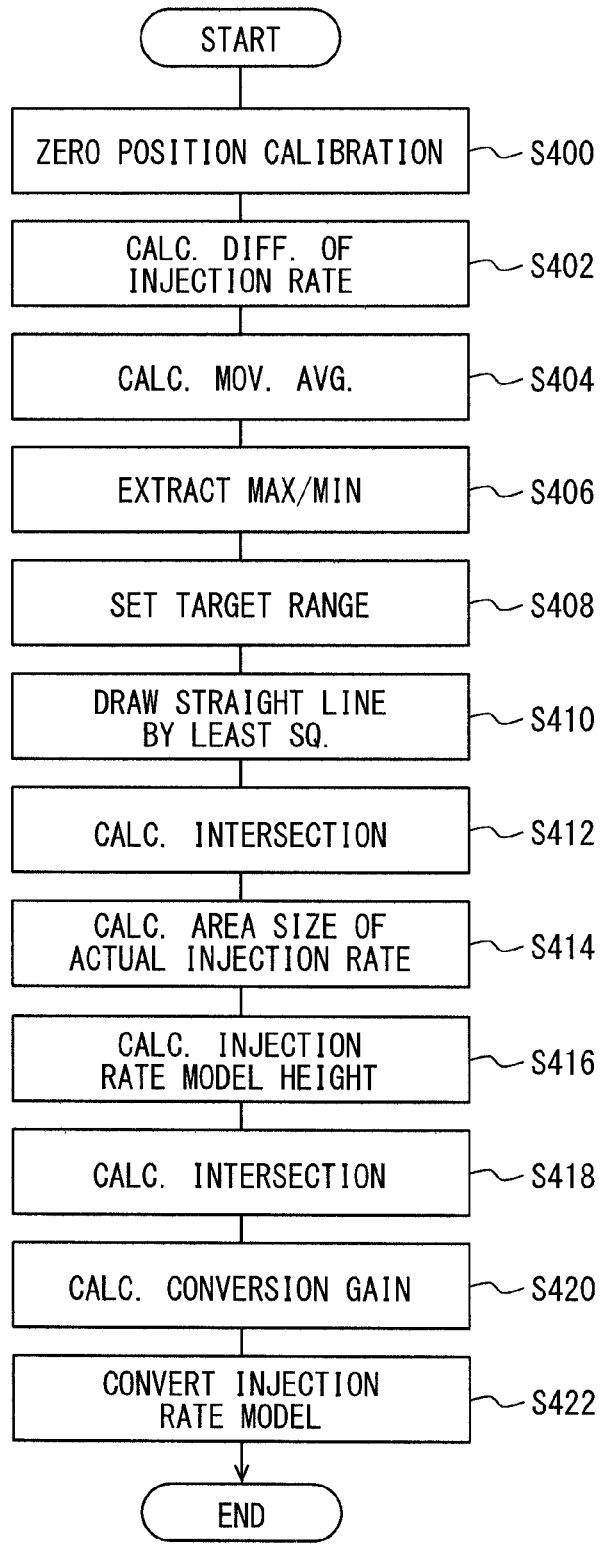
FIG. 2 is a flowchart of a data-analysis process.

The data-analysis process which is performed by the data analyzer 50 is described based on a flowchart in FIG. 2.

The data analyzer 50 controls the fuel injection valve 10 to perform a measurement injection, and obtains a detection signal from the pressure sensor 40, which detects the pressure of the measurement chamber 22. Further, the data analyzer 50 obtains, from the flowmeter 34, the flow rate of the fuel discharged from the discharge pipe 30, when (i) opening the electromagnetic open-close valve 32 after the measurement injection and (ii) reducing the fuel pressure of the measurement chamber 22 to the predetermined pressure.

Then, the data analyzer 50 performs a 0 (zero) position calibration of the detection signal of the pressure sensor 40 (S400), assuming that the fuel pressure of the measurement chamber 22 before performing a measurement injection is equal to 0.

Now, by employing the following terms, an injection quantity ΔQ is represented by an equation (1): a pressure change ΔP of the measurement chamber 22 at a time of performing the measurement injection, a capacity V of the measurement chamber 22, a volumetric coefficient of elasticity K of the fuel. The volumetric coefficient of elasticity K is corrected based on the fuel temperature of the measurement chamber 22 which is detected by the temperature sensor 42.

$$\Delta Q = (V/K) \times \Delta P \qquad \text{Equation (1)}$$

A per-unit-time injection rate ΔQ/Δt is represented by an equation (2) based on the equation (1).

$$\Delta Q/\Delta t = (V/K) \times \Delta P/\Delta t \qquad \text{Equation (2)}$$

That is, by multiplying the differentiation of the pressure of the measurement chamber 22 by the coefficient, the injection rate is calculable. Thus, in the present embodiment, the data analyzer 50 differentiates the detection signal of the pressure sensor 40 that detects the pressure of the measurement chamber 22, and obtains the injection rate from the detection signal of the pressure sensor 40 as a time-series data (S400).

Figure 3:
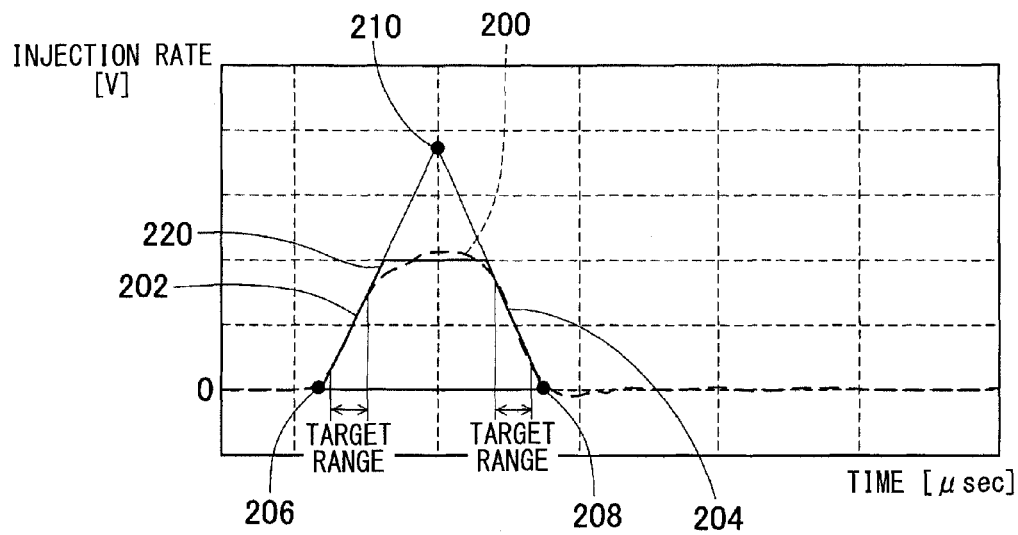
FIG. 3 is a time diagram of an injection rate.

A dotted line in FIG. 3 shows a differentiation result of the detection signal of the pressure of the measurement chamber 22 (=time differentiation) as an injection rate 200 drawn as a dotted line. The unit of the injection rate 200 is equal to the unit of the detection signal of the pressure sensor 40, i.e., a voltage [V].

The data analyzer 50 differentiates the injection rate 200 shown in FIG. 3 (S402), and calculates a moving average of the differentiation result of the injection rate (S404).

Figure 4:
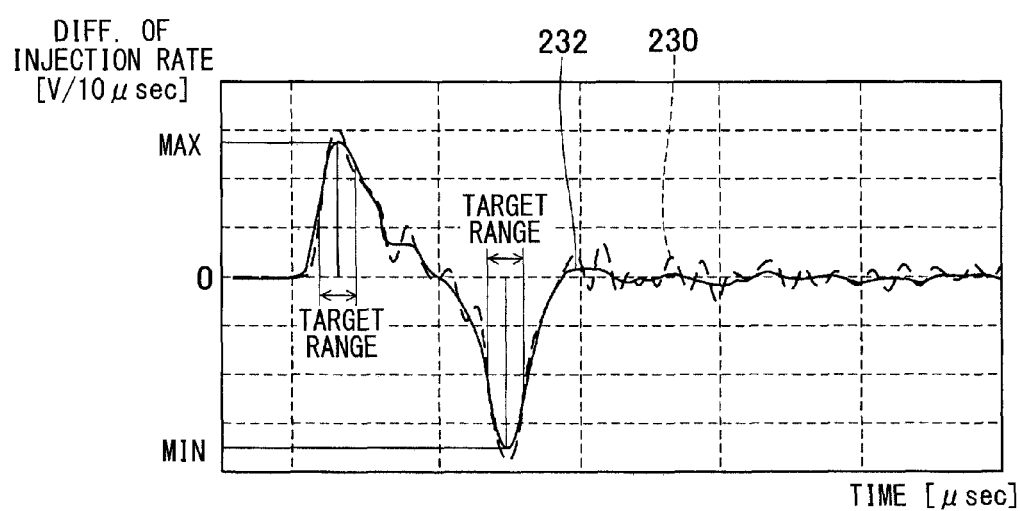
FIG. 4 is a time diagram of a differentiation result of the injection rate and a moving average of a differentiation result of the injection rate.

In FIG. 4, a dotted line shows a differentiation result 230 of the injection rate, and a solid line shows a moving average 232 of the differentiation result 230. Since the sampling interval of the pressure sensor 40 is 10 μsec in the present embodiment, the unit of the differentiation result 230 is shown by [V/10 μsec].

The data analyzer 50 extracts a maximum value and a minimum value of the moving average 232 (S406). The "maximum timing" when the moving average 232 takes the maximum value shows a timing of a maximum increase rate in the injection rate 200 (i.e., may also be designated as an increase timing, hereafter). The "minimum timing" when the moving average 232 takes the minimum value shows a timing of a maximum decrease rate in the injection rate 200 (i.e., may also be designated as a decrease timing, hereafter).

Since the waveform of the increase portion of the injection rate and the decrease portion of the injection rate is identified with the least-squares method in S410 mentioned later, the data analyzer 50 sets up a target range containing the increase timing and the decrease timing to which the least-squares method is applied as a certain time width, as shown in FIG. 4 (S408).

When the target range containing the increase timing is set up appropriately, the value of the moving average in such target range is a positive value, and the injection rate increases.

When the target range containing the decrease timing is set up appropriately, the value of the moving average in such target range, is a negative value, and the injection rate decreases.

Practically, since the detection signal of the pressure sensor 40 is obtained at the predetermined sampling interval of 10 μsec in the present embodiment, a certain number of samples before and after (i.e., including) the increase/decrease timing is set up as a target range.

The target range set up in S408 may be set up based on the differentiation result 230 and the moving average 232, or may be set up as a constant value. That is, by taking into consideration of the differentiation result 230 and the moving average 232, the target range may be set up as a range that covers, i.e., includes, the increase timing for the moving average 232 to securely take a positive value, and covers the decrease timing for the moving average 232 to securely take a negative value, for example.

In S410, in the target range set up in S408, the data analyzer 50 approximates the waveform of the increase/decrease portion of the injection rate 200, respectively by a straight line with the least-squares method, as shown in FIG. 3.

Then, the analyzer 50 calculates an intersection between two approximation lines 202, 204 and a zero injection rate line, which are respectively designated as an intersection 206 and an intersection 208 (S412).

The intersection 206 between the approximation line 202, which approximates the increase portion of the injection rate, and the zero injection rate line is an injection start timing, and, the intersection 208 between the approximation line 204, which approximates the decrease portion of the injection rate, and the zero injection rate is an injection end timing.

Further, the data analyzer 50 calculates an intersection 210 between two approximation lines 202 and 204 respectively approximating the injection rate. The intersection 210 represents a timing at which the injection rate 200 takes the maximum value.

In the injection rate 200 shown in FIG. 3, the data analyzer 50 calculates an area size of the injection rate 200 from the injection start timing to the injection end timing calculated in S412 as an area size of the actual injection rate (S414).

The data analyzer 50 calculates the area size of the actual injection rate as a sum total of the product of (i) the sampling interval of the detection signal of the pressure sensor 40 and (ii) the injection rate at each of the sampling timings.

Next, the data analyzer 50 calculates an area size of a trapezoid shape of an injection rate model 220 in a thick solid line, which has an element between the two intersections 206 and 208 as a lower base of the trapezoid.

When, for the area size calculation, the height of the trapezoid is set as a certain variable, by employing the two equations representing the approximation lines 202, 204 in S410, an upper base of the trapezoid is represented by an equation that includes the variable representing the trapezoid height.

Therefore, the trapezoid area size of the injection rate model 220 is represented by the equation which includes the height as a variable.

Based on an assumption that the area size of the actual injection rate which is calculated in S414 is equal to the trapezoid area size of the injection rate model 220, which includes the height as a variable, the data analyzer 50 calculates the trapezoid height of the injection rate model 220 (S416).

The data analyzer 50 calculates the intersections between the upper base of the injection rate model 220 and the two approximation lines 202 and 204, based on the calculated trapezoid height of the injection rate model 220 and the equations of two approximation lines 202 and 204 calculated in S410 (S418). In such manner, the shape of the injection rate model 220 is identified.

Since the injection rate model 220 is derived from the detection signal of the pressure sensor 40, the unit of the model 220 is converted to match an injection quantity per unit time, i.e., to the unit of the injection rate.

Only the height differs among (i) the trapezoid shape of the injection rate model 220, which is derived from the detection signal of the pressure sensor 40 and (ii) the trapezoid shape of the injection rate model represented by the injection quantity per unit time.

Therefore, for the calculation of a conversion coefficient of the injection rate, an assumption is employed that (A) a multiplication result of the conversion gain and the trapezoid area size of the injection rate model 220 is equal to (B) an area size of the trapezoid shape of the injection rate mode represented by the injection quantity per unit time. That is, in other words, based on an assumption that the value of (A) is equal to the injection quantity that is measured by the flowmeter 34, the conversion gain is calculable (S420).

Then, based on the conversion gain, the injection rate model 220, which is derived from the detection signal of the pressure sensor 40, is converted to the injection rate model represented by the injection quantity per unit time (S422).

Figure 5:
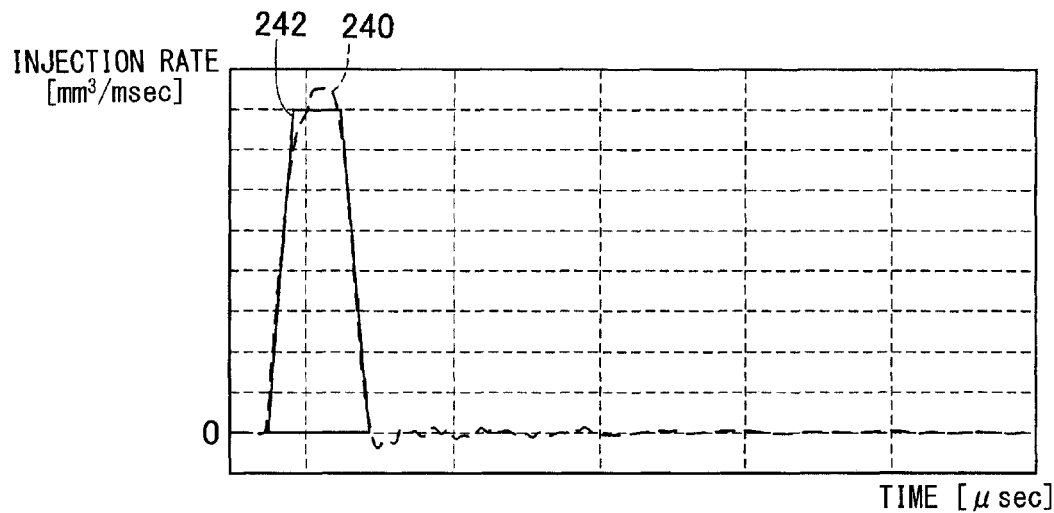
FIG. 5 is a time diagram of the injection rate after unit conversion.

FIG. 5 shows an injection rate 240 represented by the injection quantity per unit time and an injection rate model 242, which are respectively calculated by multiplying the injection rate 200 derived from the detection signal of the pressure sensor 40 and the injection rate model 220 by the conversion gain.

[1-3. Effects]

According to the first embodiment described above, the following effects are achieved.

(1) By obtaining the injection rate 200 from the detection signal of the pressure sensor 40 as the time-series data, and by differentiating the injection rate 200, the change rate of the injection rate 200, which changes over time is calculated as a noise-ridden value (i.e., as a noise included value). Then, by calculating the moving average 232 of the differentiation result 230 of the injection rate 200, the differentiation result 230 of the injection rate 200 is calculated as a value from which the noise is removed as much as possible.

Since the waveform of the noise-ridden injection rate 200 is identified based on the differentiation result of the injection rate 200 from which the noise is removed as much as possible, the characteristic points, e.g., the injection start timing and the injection end timing, are appropriately analyzable as the characteristics of the injection rate 200.

(2) Since the injection rate 200 is approximated in an appropriate target range by using an approximation line of the least-squares method, i.e., within a range that includes the maximum/minimum value of the moving average 232 of the injection rate 200 by using a straight line of approximation from the least-squares method, the waveform of the increase/decrease portion of the injection rate 200 is appropriately identified.

2. Second Embodiment

[2-1. Configuration]

In the second embodiment, the identical numerals are assigned to the identical configuration parts in view of the first embodiment.

Figure 6:
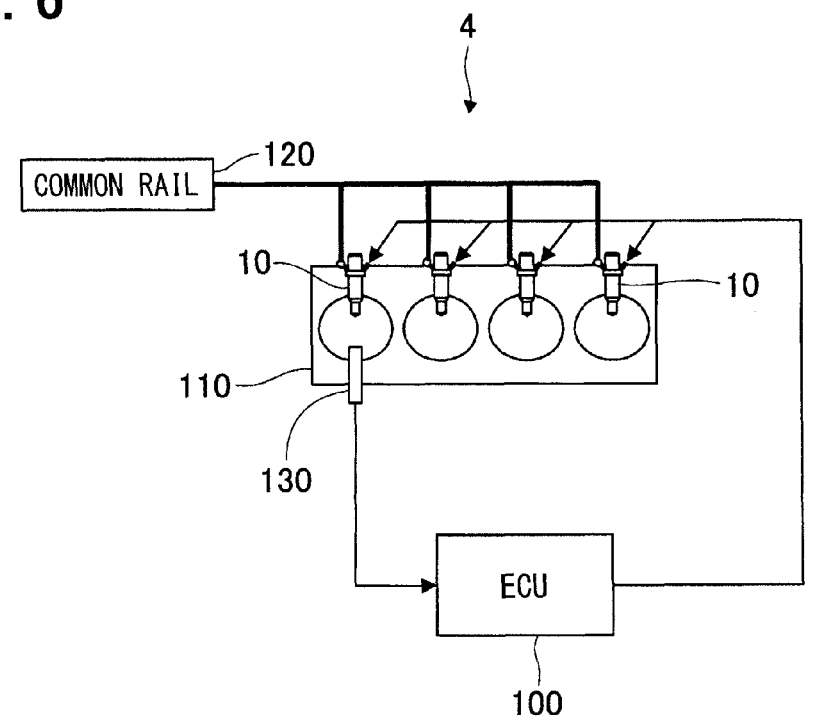
FIG. 6 is a block diagram of the data-analytic system in a second embodiment of the present disclosure.

Electronic control unit (ECU) 100 of a data-analytic system 4 shown in FIG. 6 is disposed in a vehicle, and controls the fuel injection of the fuel injection valve 10 installed in each cylinder of a diesel engine (may simply referred to as an engine hereafter) 110. The fuel that has an accumulated pressure from a common rail 120 is supplied to the fuel injection valve 10.

ECU 100 carries a microcomputer that is provided with CPU, RAM, ROM, a flash memory, etc.

When CPU of ECU 100 executes a program memorized by ROM, ECU 100 functions as the data obtainer, the differentiator, the moving averager, the range setter, the identifier, and the data characterizer, and performs the data-analysis process.

ECU 100 obtains the in-cylinder pressure from an in-cylinder pressure sensor 130 installed in one cylinder of the engine 110. Then, ECU 100 calculates a heat generation rate by the following equation (3), for a main injection and a pilot injection preceding the main injection based on the in-cylinder pressure detected by the in-cylinder pressure sensor 130. That is, ECU 100 obtains the heat generation rate from the detection signal of the in-cylinder pressure sensor 130 as the time-series data.

$$\text{Heat Generation Rate} = (V \cdot dP + \kappa \cdot P \cdot dV)/(\kappa - 1) \quad \text{Equation (3)}$$

In the equation (3), a term V is a cylinder volume capacity, a term P is an in-cylinder pressure detected by the in-cylinder pressure sensor 130, a term κ is a ratio of specific heat, respectively.

Figure 8:
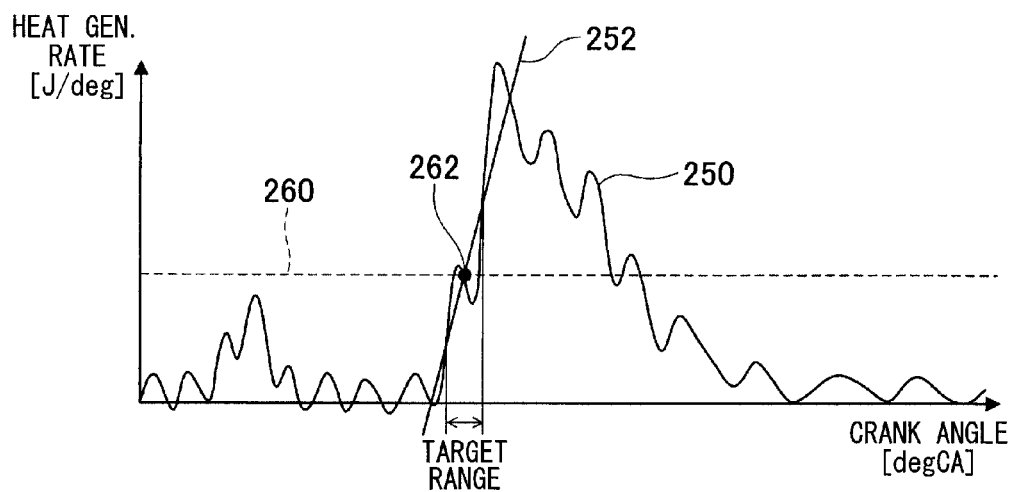
FIG. 8 is a time diagram of a heat generation rate.

A heat generation rate 250 calculated from the equation (3) is shown in FIG. 8.

In FIG. 6, although the in-cylinder pressure sensor 130 is installed only in one of many cylinders, the in-cylinder pressure sensor 130 may be installed in all of the cylinders.

[2-2. Process]

Figure 7:
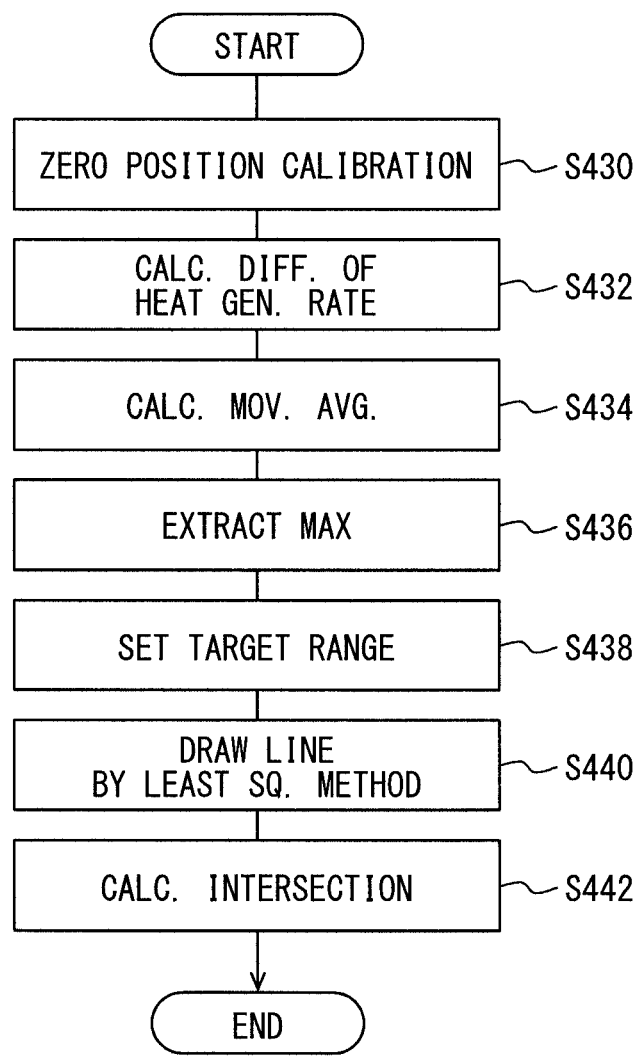
FIG. 7 is a flowchart of the data-analysis process.

The data-analysis process which performed by ECU 100 is described based on a flowchart of FIG. 7.

ECU 100 a 0 (zero) position calibration of the detection signal of the in-cylinder pressure sensor 130 (S430), assuming that an in-cylinder pressure detected at a time of no fuel injection from the valve 10 is equal to zero. Then, ECU 100 obtains the heat generation rate 250 shown in FIG. 8 from the detection signal of the in-cylinder pressure sensor 130 by the equation (3) (S430).

ECU 100 differentiates the heat generation rate 250 (S432), and calculates the moving average of the differentiation result of the heat generation rate 250 (S434).

Figure 9:
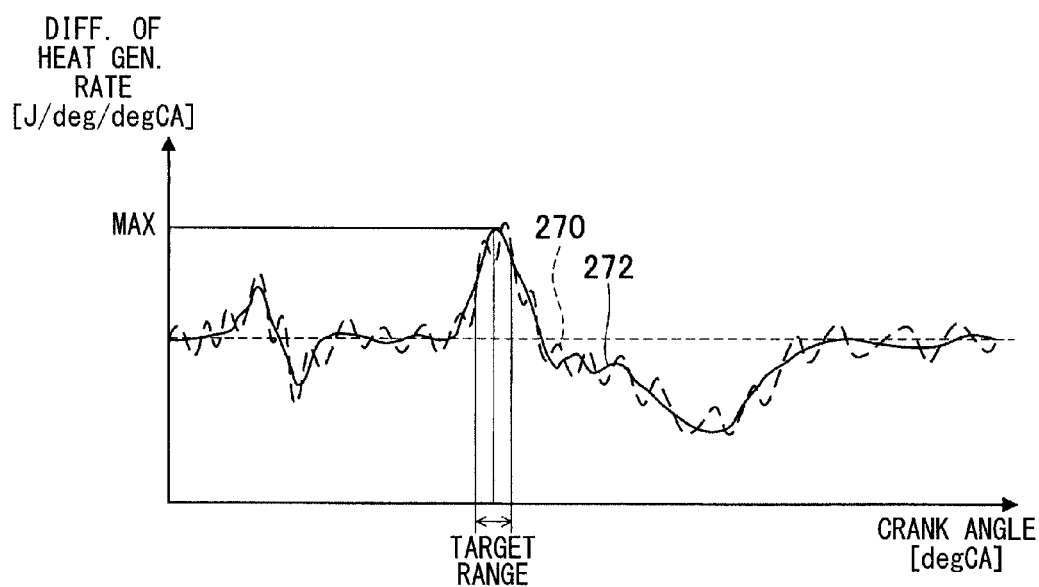
FIG. 9 is a time diagram of the differentiation result of the heat generation rate and the moving average of the differentiation result of the heat generation rate.

In FIG. 9, a dotted line shows a differentiation result 270 of the heat generation rate 250, and a solid line shows a moving average 272 of the differentiation result 270.

ECU 100 extracts the maximum value of the moving average 272 (S436). The maximum timing at which the moving average 272 takes the maximum value shows a timing of a maximum increase rate in the injection rate 250 (i.e., an increase timing). By appropriately setting the target range for an inclusion of the increase timing, the value of the moving average 272 always takes a positive value in the target range, and the heat generation rate always increases.

For the approximation of the increase portion of the heat generation rate 250 later in S440 by a linear, least-squares approximation to identify the waveform of the rate 250, ECU 100 sets up the target range containing the increase timing, as shown in FIG. 9 (S438).

The target range set up in S438 may be set up based on the value of the differentiation result 270 and the value of the moving average 272, or may be set up as a preset constant value.

In S440, as shown in FIG. 8, ECU 100 approximates, in the target range set up in S438, the increase portion of the heat generation rate 250 with a straight line of approximation from the least-squares method. Then, an intersection 262 between an approximation line 252, which approximates the heat generation rate 250 and threshold value 260 is calculated (S442). The intersection 262 represents the ignition timing.

[2-3. Effects]

According to the second embodiment described above, the following effects are achieved.

(1) By obtaining the heat generation rate 250 from the detection signal of the in-cylinder pressure sensor 130 as the time-series data, and by differentiating the heat generation rate 250, the change rate of the heat generation rate 250, which changes over time, is calculated as a noise-ridden value. Then, by calculating the moving average 272 of the differentiation result 270 of the heat generation rate 250, the differentiation result of the heat generation rate 250 is calculated as a value from which the noise is removed as much as possible.

Since the waveform of the noise-ridden heat generation rate 250 is identified by the approximation line 252, based on the differentiation result of the heat generation rate 250 from which the noise is removed as much as possible, the characteristic points, e.g., the ignition timing, are appropriately analyzable from approximation lines 252 as the characteristics of the heat generation rate 250.

(2) Since the heat generation rate 250 is approximated by a straight line of approximation with the least-squares method in the target range that includes the increase timing of the moving average 272 of the differentiation result 270 of the heat generation rate 250 (i.e., within the range that includes the maximum value of the average 272), the waveform of the increase portion of the heat generation rate 250 is appropriately identified.

3. Third Embodiment

[3-1. Configuration]

In the third embodiment, the identical numerals are assigned to the identical configuration parts in view of the second embodiment.

Figure 10:
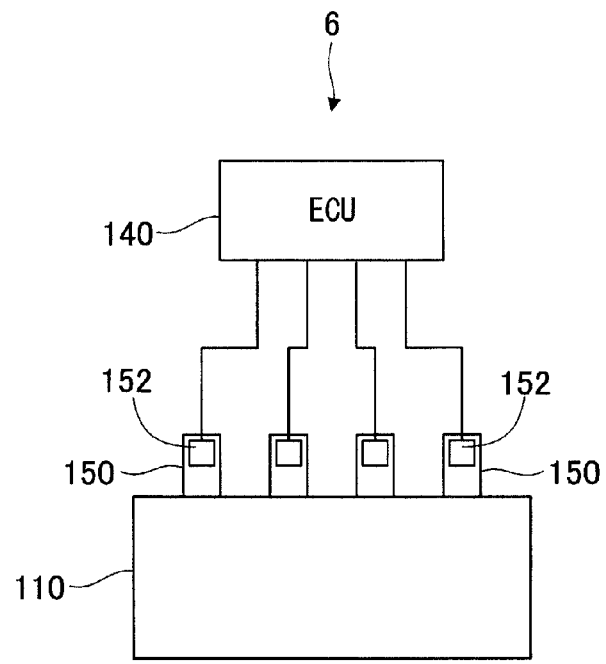
FIG. 10 is a block diagram of the data-analytic system in a third embodiment of the present disclosure.

ECU 140 of a data-analytic system 6 shown in FIG. 10 is disposed in a vehicle, and controls the fuel injection of a fuel injection valve 150 installed in each cylinder of the engine 110. The fuel having an accumulated pressure from a common rail which is not illustrated is supplied to the fuel injection valve 150. A pressure sensor 152 that detects the fuel pressure in the fuel injection valve 150 is installed in the fuel injection valve 150.

ECU 140 serving as the data analyzer has the microcomputer that is provided with CPU, RAM, ROM, the flash memory, etc.

When CPU of ECU 140 executes a program memorized by ROM, ECU 140 functions as the data obtainer, the differentiator, the moving averager, the range setter, the identifier, and the data characterizer, and performs the data-analysis process.

ECU 140 obtains the detection signal of the fuel pressure in the fuel injection valve 150 from the pressure sensor 152 that is installed in the fuel injection valve 150 as the time-series data.

[3-2. Process]

Figure 11:
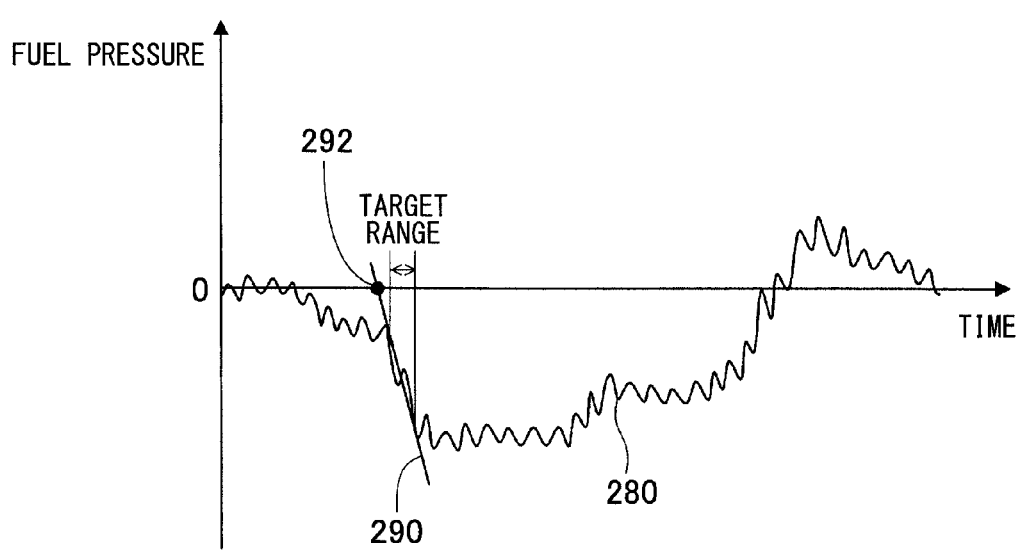
FIG. 11 is a time diagram of a fuel pressure in the fuel injection valve.

A detection signal 280 of the fuel pressure which ECU 140 obtains as the time-series data from the pressure sensor 152 in the fuel injection valve 150 is shown in FIG. 11. The noise is contained in the detection signal 280 which is obtained by ECU 140. Thus, just like the first embodiment and the second embodiment, ECU 140 differentiates the detection signal 280 of the fuel pressure as the time-series data, and calculates the moving average of the differentiation result.

Since it is the same processing scheme as the first embodiment and the second embodiment, the drawings showing the differentiation result and the moving average of the differentiation result of the detection signal 280 is omitted.

ECU 140 approximates the waveform of the detection signal 280 by an approximation line 290 from the least-squares method in, for example, the predetermined target range which contains the minimum value of the moving average as shown in FIG. 11, and calculates an intersection between the approximation line 290 and a zero fuel pressure line. The intersection 292 represents an injection start timing.

[3-3. Effects]

The effects of the third embodiment are basically same as the effects (1) and (2) of the second embodiment, i.e., replacing the sensor 130 with the sensor 152, replacing the heat generation rate with the fuel pressure, replacing the line 252 with the line 290, and replacing the maximum value of the moving average with the minimum value of the moving average.

4. Other Embodiments (1) According to the above-mentioned embodiments, the data analyzer obtains, from the detection signal of the sensor, the injection rate, the heat generation rate, and the fuel pressure in the fuel injection valve 150 as the time-series data, and analyzes the data. However, as long as obtaining the time-series data which changes along the fuel injections from the fuel injection valve over time based on the detection signal of the sensor, the data analyzer may obtain any time-series data other than the above.

Further, as long as obtaining the time-series data which changes over time from the detection signal of the sensor, any time-series data other than the time-series data which changes along the fuel injections from the fuel injection valve over time may be obtained for the analysis.

(2) According to the above-mentioned embodiment, the waveform of the time-series data is approximated by a straight line of the least-squares method. However, as long as enabling an appropriate approximation of the waveform of the time-series data, the waveform of the time-series data may be approximated by any function, e.g., by a quadratic function.

(3) The function of one element in the above embodiments may be distributed to two or more elements, or the functions of two or more elements may be aggregated to one element. Further, a part of the configuration described above may be dispensed with. Further, a part of the configuration described above in one embodiment may be added to the other embodiment, or may be replaced in the other embodiment. The scope of the appended claims is described but not limited in any manner by the above-described embodiment.

(4) The present disclosure may take various forms, i.e., not only the data analyzer 50 as well as ECUs 100 and 140, etc. mentioned above, but also the data-analytic systems 2, 4, 6 which use ECUs 100 and 140 as functional elements, a data-analysis program for operating a computer as the data analyzer 50, ECUs 100 and 140, or a storage medium storing such a program, a method of data analysis relevant to the above and the like. That is, the present disclosure is realizable in various forms of computer-implemented devices.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A data analyzer for analyzing characterization data to perform fuel injection control, comprising:
    a data analyzing processor, the data analyzing processor configured to include
        a data obtainer obtaining data from a detection signal of a sensor as a time-series data that changes over time;
        a differentiator differentiating the time-series data obtained by the data obtainer;
        a moving averager calculating a moving average of the differentiated time-series data by the differentiator;
        an identifier identifying a waveform of the time-series data based on the moving average calculated by the moving averager;
        a data characterizer characterizing the time-series data based on the waveform of the time-series data identified by the identifier to thereby generate the characterization data; and
    a controller for controlling fuel injection based on the characterization data.

2. The data analyzer of claim 1 further comprising:
    a range setter setting an identification range used by the identifier for identifying the waveform based on the moving average.

3. The data analyzer of claim 2, wherein
    the range setter sets the identification range as a range of time including a particular timing of the time-series data, and
    the particular timing of the time-series data is at least one of a maximum value and a minimum value of the moving average.

4. The data analyzer of claim 2, wherein
the range setter identifies the waveform by a least square method based on the time-series data in the identification range.

5. The data analyzer of claim 1, wherein
the data obtainer obtains the time-series data that changes over time which is caused by a fuel injection from a fuel injection valve into an internal combustion engine.

6. The data analyzer of claim 5, wherein
the data obtainer obtains, from the detection signal of the sensor, the time-series data about an injection rate of the fuel injection valve.

7. The data analyzer of claim 5, wherein
the data obtainer obtains, from the detection signal of the sensor, the time-series data about a heat generation rate of cylinders of the internal combustion engine.

8. The data analyzer of claim 5, wherein
the data obtainer obtains, from the detection signal of the sensor, the time-series data about a fuel pressure in the fuel injection valve.

9. A data-analytic system for analyzing characterization data to perform fuel injection control, comprising:
 a fuel injection valve attached to a measurement container having a measurement chamber, the fuel injection valve injecting fuel into the measurement chamber;
 a pressure sensor detecting a fuel pressure of the measurement chamber; and
 a data analyzer controlling an injection of fuel from the fuel injector valve, wherein
 the data analyzer configured to include
  a data obtainer obtaining data from a detection signal of the pressure sensor as a time-series data that changes over time;
  a differentiator differentiating the time-series data obtained by the data obtainer;
  a moving averager calculating a moving average of the differentiated time-series data by the differentiator;
  an identifier identifying a waveform of the time-series data based on the moving average calculated by the moving averager;
  a data characterizer characterizing the time-series data based on the waveform of the time-series data identified by the identifier to thereby generate the characterization; and
  a controller for controlling fuel injection based on the characterization data.

10. A data analyzing method for performing fuel injection control, comprising:
 obtaining data from a detection signal of a sensor as a time-series data that changes over time by a data obtainer;
 differentiating the time-series data obtained by the data obtainer by a differentiator;
 calculating a moving average of the differentiated time-series data by the differentiator by a moving averager;
 identifying a waveform of the time-series data based on the moving average calculated by the moving averager by an identifier;
 characterizing the time-series data based on the waveform of the time-series data identified by the identifier by a data; and
 controlling fuel injection based on the characterization of the time-series data.

* * * * *